US012220907B2

(12) United States Patent
Yoshida et al.

(10) Patent No.: US 12,220,907 B2
(45) Date of Patent: Feb. 11, 2025

(54) PRINTING APPARATUS, CONTROL METHOD, PROGRAM, INFORMATION PROCESSING APPARATUS, AND PRINTING SYSTEM

(71) Applicant: Seiko Instruments Inc., Chiba (JP)

(72) Inventors: Daisuke Yoshida, Chiba (JP); Yuichi Yoshigi, Chiba (JP); Hiroaki Kondo, Chiba (JP); Yoshio Kitamura, Chiba (JP); Koichi Hatakeyama, Chiba (JP); Koki Yoshida, Chiba (JP); Ryota Naka, Chiba (JP)

(73) Assignee: SEIKO INSTRUMENTS INC., Chiba (JP)

(*) Notice: Subject to any disclaimer, the term of this patent is extended or adjusted under 35 U.S.C. 154(b) by 121 days.

(21) Appl. No.: 18/187,094

(22) Filed: Mar. 21, 2023

(65) Prior Publication Data

US 2023/0322001 A1 Oct. 12, 2023

(30) Foreign Application Priority Data

Mar. 23, 2022 (JP) ................................ 2022-047165

(51) Int. Cl.
*B41J 11/42* (2006.01)
*B41J 2/32* (2006.01)

(52) U.S. Cl.
CPC ................ *B41J 11/42* (2013.01); *B41J 2/32* (2013.01)

(58) Field of Classification Search
CPC ..... B41J 11/42; B41J 11/0075; B41J 11/0095; B41J 13/00; B41J 13/0009; B41J 15/00; B41J 15/04; B41J 15/044; B41J 15/046
See application file for complete search history.

(56) References Cited

U.S. PATENT DOCUMENTS

2015/0227101 A1* 8/2015 Uchida ................ G03G 15/553
399/24

FOREIGN PATENT DOCUMENTS

JP 2009269713 * 11/2009 ............ B65H 26/02
JP 2011-026077 A 2/2011

* cited by examiner

*Primary Examiner* — Kristal Feggins
(74) *Attorney, Agent, or Firm* — Crowell & Moring LLP

(57) ABSTRACT

A printing apparatus includes: a user-setting-value acquiring unit configured to acquire a user setting value indicating a remaining amount of paper on a paper roll, the user setting value being set by a user; a first detection unit configured to detect that a physical quantity correlated with a remaining amount of paper on the paper roll has become equal to a first threshold value; a second detection unit configured to detect that the remaining amount of paper on the paper roll has become equal to a second threshold value; a post-detection length acquiring unit configured to acquire a post-detection length being a length of paper used from the paper roll from a time when it is detected that the physical quantity has become equal to the first threshold value until the remaining amount of paper on the paper roll becomes equal to the second threshold value; and a notification unit configured to notify that, when a new paper roll is used and a length of paper used from the new paper roll from a time when it is detected that the physical quantity has become equal to the first threshold value exceeds a reference value obtained by subtracting the user setting value from the post-detection length, a remaining amount of paper on the new paper roll has become equal to the user setting value.

6 Claims, 9 Drawing Sheets

| DIAMETER OF PAPER ROLL | OBJECT FACING FRONT PORTION OF NEAR-END SENSOR | DISTANCE FROM OBJECT DETECTED BY NEAR-END SENSOR |
|---|---|---|
| LARGE | SIDE SURFACE PORTION OF PAPER ROLL **OR** SIDE SURFACE PORTION OF PAPER CORE | NEAR |
| SMALL | HOLLOW PORTION OF PAPER CORE | FAR |

PRINTING APPARATUS, CONTROL METHOD, PROGRAM, INFORMATION PROCESSING APPARATUS, AND PRINTING SYSTEM

RELATED APPLICATIONS

This application claims priority to Japanese Patent Application No. 2022-047165 filed on Mar. 23, 2022, the entire content of which is incorporated herein by reference.

BACKGROUND OF THE INVENTION

1. Field of the Invention

The present invention relates to a printing apparatus, a control method, a program, an information processing apparatus, and a printing system.

2. Description of the Related Art

There exists a printing apparatus that uses a paper roll of thermal paper. For such a printing apparatus, there is generally known a method of detecting a reduction in diameter of a paper roll with use of a sensor so as to detect a near end of the paper roll.

In the detection method using a sensor, a variation in diameter or thickness of a paper core of a paper roll is estimated in advance. Thus, even when a relatively large length of usable paper remains, a near end may sometimes be detected depending on a kind of paper roll that is used.

In this context, there is known a technology of detecting a near end by predicting a length of remaining paper on a paper roll based on a length of used paper per unit time and a preset margin time period after the detection of a near end with use of a sensor (see, for example, Japanese Patent Application Laid-open No. 2011-26077).

However, it is not common that the length of used paper per unit time is always the same. Thus, with the above-mentioned related-art technology, a near end cannot be detected with high accuracy. Further, there is a technology that does not notify a user of the detection of a near end even when a sensor detects the near end. According to the technology, when a given amount of paper is used after the detection of a near end, the user is notified of the near end. Notification timing is delayed in the above-mentioned manner so that a smaller length of usable paper remains on the paper roll at a time of the notification.

When the technology described above is used, a length of remaining paper after the near end is detected by the sensor is required to be checked in advance. However, a paper roll used by a user is different for each user. Thus, a length of remaining paper after the detection of the near end is not the same in many cases. In such cases, there is a possibility that a length of usable remaining paper may be longer than assumed. Thus, a user may check or set a remaining length after the detection of the near end. However, checking a remaining length may bother a user and is therefore not practical.

As described above, with the related-art technology, it is difficult for a user to detect a near end with high accuracy. Further, a user cannot set a remaining amount of paper on a paper roll, based on which a near end is to be notified.

In view of the circumstances described above, the present invention has an object to provide a technology that enables accurate detection of a remaining amount of paper on a paper roll, which is set by a user.

SUMMARY OF THE INVENTION

According to one embodiment of the present invention, there is provided printing apparatus including: a user-setting-value acquiring unit configured to acquire a user setting value indicating a remaining amount of paper on a paper roll, the user setting value being set by a user; a first detection unit configured to detect that a physical quantity correlated with a remaining amount of paper on the paper roll has become equal to a first threshold value; a second detection unit configured to detect that the remaining amount of paper on the paper roll has become equal to a second threshold value; a post-detection length acquiring unit configured to acquire a post-detection length being a length of paper used from the paper roll from a time when it is detected that the physical quantity has become equal to the first threshold value until the remaining amount of paper on the paper roll becomes equal to the second threshold value; and a notification unit configured to notify that, when a new paper roll is used and a length of paper used from the new paper roll from a time when it is detected that the physical quantity has become equal to the first threshold value exceeds a reference value obtained by subtracting the user setting value from the post-detection length, a remaining amount of paper on the new paper roll has become equal to the user setting value.

In the above-mentioned printing apparatus according to the one embodiment of the present invention, the printing apparatus including a correction unit configured to correct the post-detection length in accordance with a length of paper used from the new paper roll from a time when the length of paper used from the new paper roll after it is detected that the physical quantity has become equal to the first threshold value exceeds the reference value obtained by subtracting the user setting value from the post-detection length until the physical quantity becomes equal to the second threshold value.

According to one embodiment of the present invention, there is provided control method for a printing apparatus, including: a user-setting-value acquiring step of acquiring a user setting value indicating a remaining amount of paper on a paper roll, the user setting value being set by a user; a first detection step of detecting that a physical quantity correlated with a remaining amount of paper on the paper roll has become equal to a first threshold value; a second detection step of detecting that the remaining amount of paper on the paper roll has become equal to a second threshold value; a post-detection length acquiring step of acquiring a post-detection length being a length of paper used from the paper roll from a time when it is detected that the physical quantity has become equal to the first threshold value until the remaining amount of paper on the paper roll becomes equal to the second threshold value; and a notification step of notifying that, when a new paper roll is used and a length of paper used from the new paper roll from a time when it is detected that the physical quantity has become equal to the first threshold value exceeds a reference value obtained by subtracting the user setting value from the post-detection length, a remaining amount of paper on the new paper roll has become equal to the user setting value.

According to one embodiment of the present invention, there is provided program for causing a computer to function as a printing apparatus, the program being configured to cause the computer to function as: a user-setting-value acquiring unit configured to acquire a user setting value indicating a remaining amount of paper on a paper roll, the user setting value being set by a user; a first detection unit configured to detect that a physical quantity correlated with a remaining amount of paper on the paper roll has become equal to a first threshold value; a second detection unit configured to detect that the remaining amount of paper on the paper roll has become equal to a second threshold value; a post-detection length acquiring unit configured to acquire a post-detection length being a length of paper used from the paper roll from a time when it is detected that the physical quantity has become equal to the first threshold value until the remaining amount of paper on the paper roll becomes equal to the second threshold value; and a notification unit configured to notify that, when a new paper roll is used and a length of paper used from the new paper roll from a time when it is detected that the physical quantity has become equal to the first threshold value exceeds a reference value obtained by subtracting the user setting value from the post-detection length, a remaining amount of paper on the new paper roll has become equal to the user setting value.

According to one embodiment of the present invention, there is provided information processing apparatus being communicable to/from a printing apparatus, the information processing apparatus, including: a user-setting-value acquiring unit configured to acquire a user setting value indicating a remaining amount of paper on a paper roll, the user setting value being set by a user; a use-amount acquiring unit configured to acquire a length of paper used from the paper roll in the printing apparatus; a post-detection length acquiring unit configured to acquire a post-detection length being a length of paper used from the paper roll in the printing apparatus from a time when it is notified that a physical quantity correlated with a remaining amount of paper on the paper roll has become equal to a first threshold value until it is notified that the remaining amount of paper on the paper roll has become equal to a second threshold value; and a notification unit configured to notify that, when a new paper roll is used and a length of paper used from the new paper roll after it is notified that the physical quantity has become equal to the first threshold value exceeds a reference value obtained by subtracting the user setting value from the post-detection length, a remaining amount of paper on the new paper roll has become equal to the user setting value.

According to one embodiment of the present invention, there is provided printing system, including a printing apparatus and an information processing apparatus being communicable to/from the printing apparatus, the printing apparatus including: a first detection unit configured to detect that a physical quantity correlated with a remaining amount of paper on a paper roll has become equal to a first threshold value; a second detection unit configured to detect that the remaining amount of paper on the paper roll has become equal to a second threshold value; a first notification unit configured to notify the information processing apparatus that, when it is detected that the physical quantity has become equal to the first threshold value, the physical quantity has become equal to the first threshold value; a second notification unit configured to notify the information processing apparatus that, when it is detected that the remaining amount of paper on the paper roll has become equal to the second threshold value, the physical quantity has become equal to the second threshold value; and a use-amount notifying unit configured to notify the information processing apparatus of a length of paper used from the paper roll, the information processing apparatus including: a user-setting-value acquiring unit configured to acquire a user setting value indicating a remaining amount of paper on the paper roll, the user setting value being set by a user; a use-amount acquiring unit configured to acquire the length of paper used from the paper roll, which is notified by the use-amount notifying unit; a post-detection length acquiring unit configured to acquire a post-detection length being a length of paper used from the paper roll from a time when the first notification unit notifies that the physical quantity has become equal to the first threshold value until the second notification unit notifies that the remaining amount of paper on the paper roll has become equal to the second threshold value; and a notification unit configured to notify that, when a new paper roll is used and a length of paper used from the new paper roll after the first notification unit notifies that the physical quantity has become equal to the first threshold value exceeds a reference value obtained by subtracting the user setting value from the post-detection length, the remaining amount of paper on the new paper roll has become equal to the user setting value.

DETAILED DESCRIPTION OF THE PREFERRED EMBODIMENTS

Now, a specific configuration example of the present invention is described with reference to the accompanying drawings.

Figure 1:
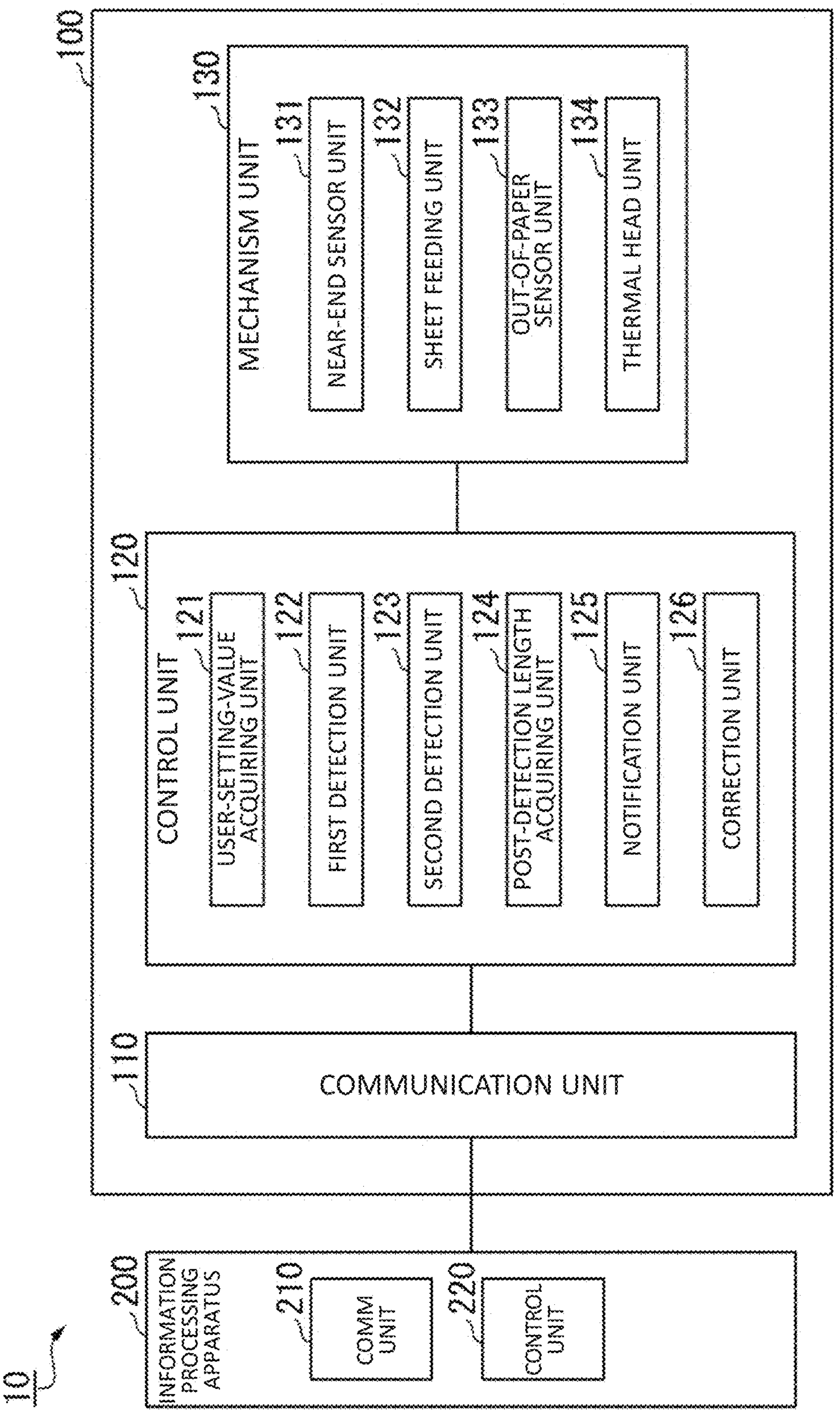
FIG. 1 is a diagram for illustrating a configuration example of a printing system.

FIG. 1 is a diagram for illustrating a configuration example of a printing system 10 according to at least one embodiment of the present invention. The printing system 10 includes a printing apparatus 100 and an information processing apparatus 200. In the at least one embodiment, a thermal printer is described as an example of the printing apparatus 100. The information processing apparatus 200 is, for example, a smartphone or a personal computer (PC). The information processing apparatus 200 includes a communication unit 210 and a control unit 220. In the at least one embodiment, the communication unit 210 communicates to/from the printing apparatus 100. In the communication, various protocols such as Bluetooth (trademark) and Wi-Fi (trademark) are used.

The control unit 220 includes an arithmetic device and a storage device. The arithmetic device is hardware such as a central processing unit (CPU), an application specific integrated circuit (ASIC), or a field programmable gate array (FPGA). The storage device is a volatile storage device or a nonvolatile storage device, such as a random access memory (RAM), a read only memory (ROM), or a flash memory. Besides, the control unit 220 includes a display device (not shown) such as a liquid crystal display or an organic electro-luminescence display and an operating device (not shown) that receives an operation performed by a user, such as a touch panel or a hardware key.

The printing apparatus 100 includes a communication unit 110, a control unit 120, and a mechanism unit 130. In the at least one embodiment, the communication unit 110 communicates to/from the information processing apparatus 200. In the communication, various protocols such as Bluetooth and Wi-Fi are used as described above.

Figure 2:
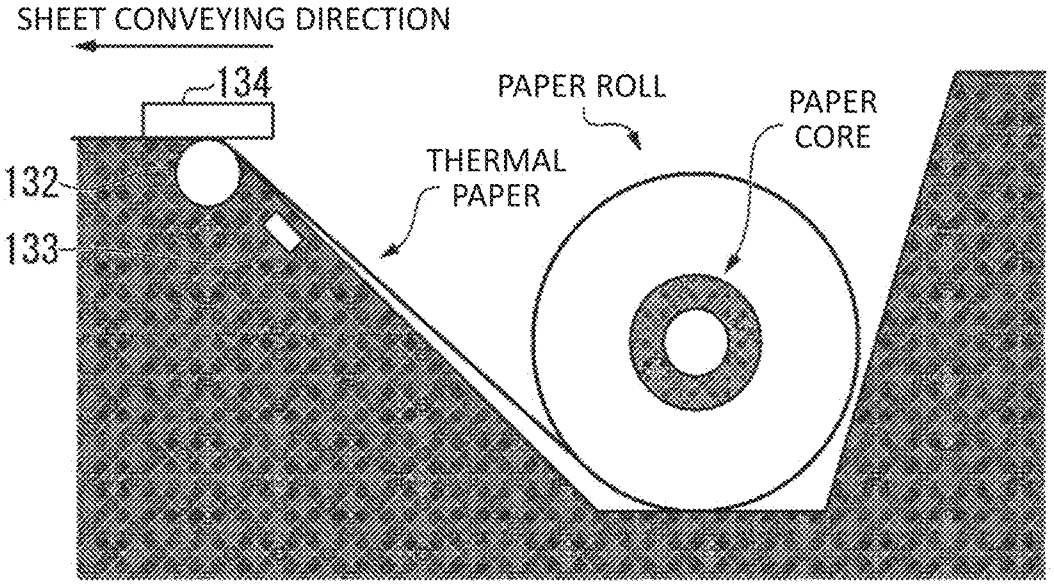
FIG. 2 is a view for illustrating an example of configurations relating to a paper roll.

The mechanism unit 130 includes a near-end sensor unit 131, a sheet feeding unit 132, an out-of-paper sensor unit 133, and a thermal head unit 134. FIG. 2 is a view for illustrating an example of configurations relating to a paper roll. More specifically, FIG. 2 is a view for illustrating an example of configurations of the sheet feeding unit 132, the out-of-paper sensor unit 133, and the thermal head unit 134. In FIG. 2, a paper roll is illustrated together with the sheet feeding unit 132, the out-of-paper sensor unit 133, and the thermal head unit 134.

The sheet feeding unit 132 includes, for example, a stepping motor, and conveys thermal paper in a "sheet conveying direction" illustrated in FIG. 2 under control of the control unit 120. The thermal head unit 134 prints, for example, characters on the thermal paper under control of the control unit 120. In the following description, the term "character printing" may be used and is synonymous with the term "printing."

The out-of-paper sensor unit 133 is configured to be capable of detecting thermal paper. When the out-of-paper sensor unit 133 fails to detect thermal paper, the out-of-paper sensor unit 133 determines that no paper is left. A remaining amount of paper on the paper roll when the out-of-paper sensor unit 133 fails to detect thermal paper corresponds to a second threshold value. As illustrated in FIG. 2, a distance between the out-of-paper sensor unit 133 and the thermal head unit 134 is not zero. However, for easy understanding of the description, the second threshold value is described as zero in the at least one embodiment. When the out-of-paper sensor unit 133 illustrated in FIG. 2 determines that no paper is left, the out-of-paper sensor unit 133 notifies the control unit 120 that the remaining amount of paper on the paper roll has become equal to the second threshold value.

The printing apparatus 100 in the at least one embodiment is configured to allow a paper roll to be placed therein. Thus, when a diameter of the paper roll decreases along with the use of paper from the paper roll, a position of a paper core gradually moves downward under its own weight. The thermal head unit 134 and the sheet feeding unit 132 are arranged so as to be opposed to each other across the thermal paper. Further, the out-of-paper sensor unit 133 is provided in the vicinity of the sheet feeding unit 132.

Figure 3:
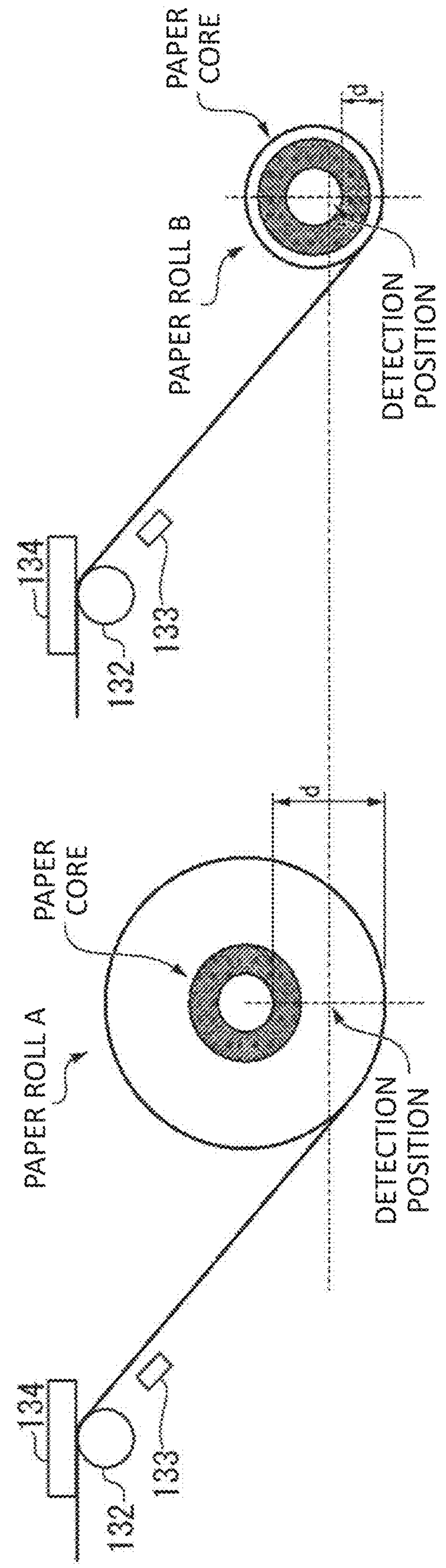
FIG. 3 is a view for illustrating a positional relationship of the paper roll with respect to a detection position of a near-end sensor unit.
Figures 4, 5:
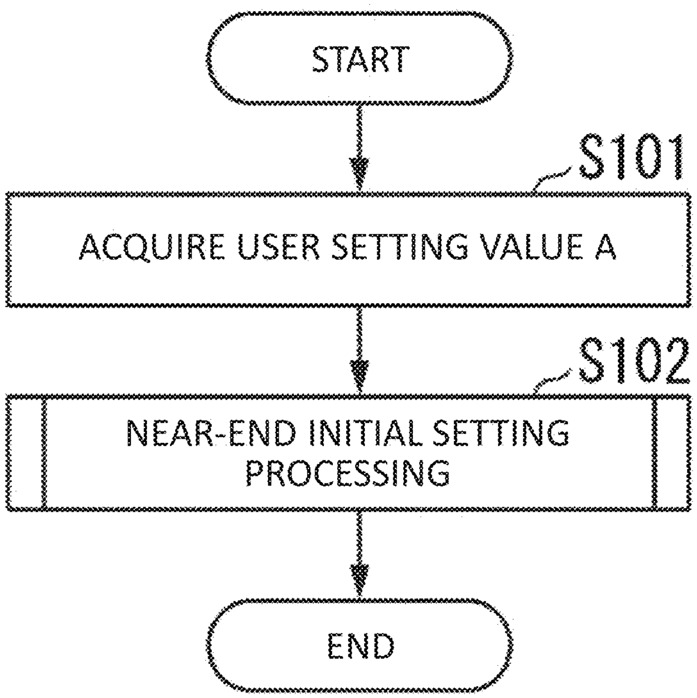
FIG. 4 is a table for showing differences caused depending on a diameter of the paper roll.
FIG. 5 is a flowchart for illustrating a flow of processing performed by a printing apparatus.

FIG. 3 is a view for illustrating a positional relationship of the paper roll with respect to a detection position of the near-end sensor unit 131. The near-end sensor unit 131 is provided so as to face a side surface of the paper roll. On the left side of FIG. 3, a paper roll A having a relatively large diameter is illustrated. On the right side of FIG. 3, a paper roll B having a diameter that is reduced as a result of use of paper is illustrated. As illustrated in FIG. 4, when the paper roll has a large diameter, a side surface portion of the paper roll or a side surface portion of the paper core is located as a detected object, facing a front portion of the near-end sensor unit 131. Meanwhile, when the paper roll has a smaller diameter, a hollow portion of the paper core is located as a detected object, facing the front portion of the near-end sensor unit 131. Thus, when the paper roll has a smaller diameter, a distance from the detected object is larger than a distance from the detected object when the paper roll has a larger diameter.

Taking advantage of the difference in distance, when a lower end of the hollow portion of the paper core in a vertical direction moves under its own weight along with the use of the paper roll and reaches the detection position, the near-end sensor unit 131 determines that a near end has been detected. Thus, in the at least one embodiment, a "physical quantity correlated with a remaining amount of paper on the paper roll" corresponds to a distance "d" from a bottom surface to a position of the lower end of the hollow portion of the paper core in the vertical direction. The distance from the bottom portion to the lower end of the hollow portion of the paper core in the vertical direction when the lower end of the hollow position of the paper core in the vertical direction reaches the detection position corresponds to a first threshold value. As described above, the near-end sensor unit 131 detects that the physical quantity correlated with the remaining amount of paper on the paper roll has become equal to the first threshold value. When the near-end sensor unit 131 detects that the physical quantity has become equal to the first threshold value, the near-end sensor unit 131 notifies the control unit 120 that the physical quantity has become equal to the first threshold value.

The control unit 120 is described with reference to FIG. 1 again. The control unit 120 includes a user-setting-value acquiring unit 121, a first detection unit 122, a second detection unit 123, a post-detection length acquiring unit 124, a notification unit 125, and a correction unit 126. The control unit 120 includes an arithmetic device and a storage device. The arithmetic device is hardware such as a CPU, an ASIC, or an FPGA. The storage device is a volatile storage device or a nonvolatile storage device, such as a RAM, a ROM, or a flash memory.

The user-setting-value acquiring unit 121 acquires a user setting value indicating a remaining amount of paper on the paper roll, which is set by a user. The user-setting-value acquiring unit 121 may acquire, for example, the user setting value that is set by a user in the information processing apparatus 200 from the information processing apparatus 200. The first detection unit 122 detects that the physical quantity correlated with the remaining amount of paper on the paper roll has become equal to the first threshold value based on the notification from the near-end sensor unit 131. The second detection unit 123 detects that the remaining amount of paper on the paper roll has become equal to the second threshold value based on the notification from the out-of-paper sensor unit 133.

The post-detection length acquiring unit 124 acquires a post-detection length being a length of paper used from the paper roll from the time when it is detected that the length "d" has become equal to the first threshold value until it is detected that the remaining amount of paper on the paper roll has become equal to the second threshold value. A method of acquiring the post-detection length is described later.

When a new paper roll is started to be used and a length of paper used from the paper roll after it is detected that the distance "d" has become equal to the first threshold value exceeds a reference value obtained by subtracting the user setting value from the post-detection length, the notification unit 125 notifies that the remaining amount of paper on the paper roll has become equal to the user setting value (hereinafter this notification is also referred to as "near-end notification"). In this case, a "new paper roll" is an unused paper roll that is placed in the printing apparatus 100 so as to replace the paper roll for which the post-detection length has been acquired by the post-detection length acquiring unit 124. In the at least one embodiment, a paper roll of the same model is placed in the printing apparatus 100 for each time. An opening and closing sensor (not shown) is used to detect whether or not the paper roll has been replaced by a new one. The opening and closing sensor detects opening and closing of a cover under which the paper roll is stored. For example, when the cover is opened and the near-end sensor unit 131 does not detect that the distance "d" has become equal to the first threshold value, the placement of a new paper roll in the printing apparatus 100 may be determined.

The notification unit 125 transmits a notification to the information processing apparatus 200. When the information processing apparatus 200 is notified that the remaining amount of paper on the paper roll has become equal to the user setting value, the information processing apparatus 200 uses, for example, a display device to notify the user that the remaining amount of paper on the paper roll has become equal to the user setting value. Alternatively, a light-emitting diode for notifying that the remaining amount of paper on the paper roll has become equal to the user setting value may be provided to the printing apparatus 100, and a notification that the remaining amount of paper on the paper roll has become equal to the user setting value may be issued as a task of controlling the light-emitting diode. The task of controlling the light-emitting diode is, when the remaining amount of paper on the paper roll becomes equal to the user setting value, to control the light-emitting diode to operate in a mode different from a mode in which the light-emitting diode operates when the remaining amount of paper on the paper roll is not equal to the user setting value yet, for example, to control the light-emitting diode to turn on or flash. The correction unit 126 corrects the post-detection length. A correction method is described later.

Figure 6:
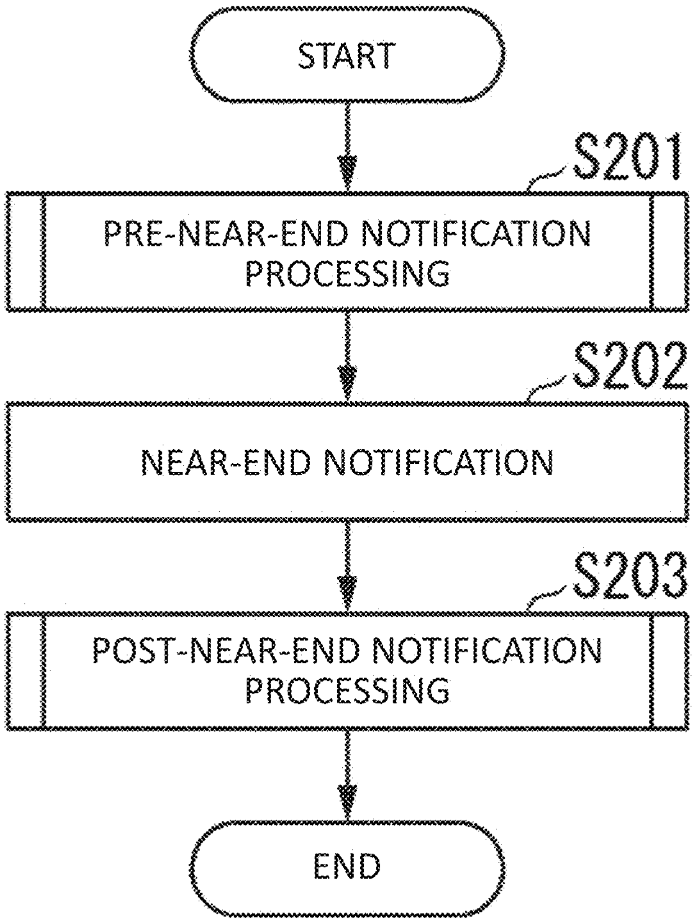
FIG. 6 is a flowchart for illustrating a flow of processing performed by the printing apparatus.

Flows of processing performed by the printing apparatus 100 are described with reference to flowcharts. The processing performed by the printing apparatus 100 is roughly classified into two flows of processing. A first processing flow illustrated in FIG. 5 is performed mainly to acquire the post-detection length. A second processing flow illustrated in FIG. 6 is performed mainly to issue a near-end notification based on the acquired post-detection length for a paper roll that is placed in the printing apparatus 100 to replace the paper roll from which the post-detection length has been acquired. As described above, in the at least one embodiment, a first paper roll is used to prepare for a near-end notification, and the near-end notification is issued for second and subsequent paper rolls.

FIG. 5 and FIG. 6 are flowcharts each for illustrating a flow of the processing performed by the printing apparatus 100. In FIG. 5, the printing apparatus 100 acquires a user setting value A (Step S101). The printing apparatus 100 performs near-end initial setting processing for acquiring the post-detection length described above under a state in which an unused paper roll is placed (Step S102), and then ends the processing. Details of the near-end initial setting processing are described later. When a new unused paper roll is placed in the printing apparatus 100 after the end of the processing illustrated in FIG. 5, the processing illustrated in FIG. 6 is started.

In FIG. 6, the printing apparatus 100 performs pre-near-end notification processing (Step S201). Details of the pre-near-end notification processing are described later. The printing apparatus 100 issues a near-end notification (Step S202). This notification allows the user to recognize that the remaining amount of paper on the paper roll has become equal to the user setting value. The printing apparatus 100 performs post-near-end notification processing (Step S203), and then ends the processing. Details of the post-near-end notification processing are described later.

Figure 7:
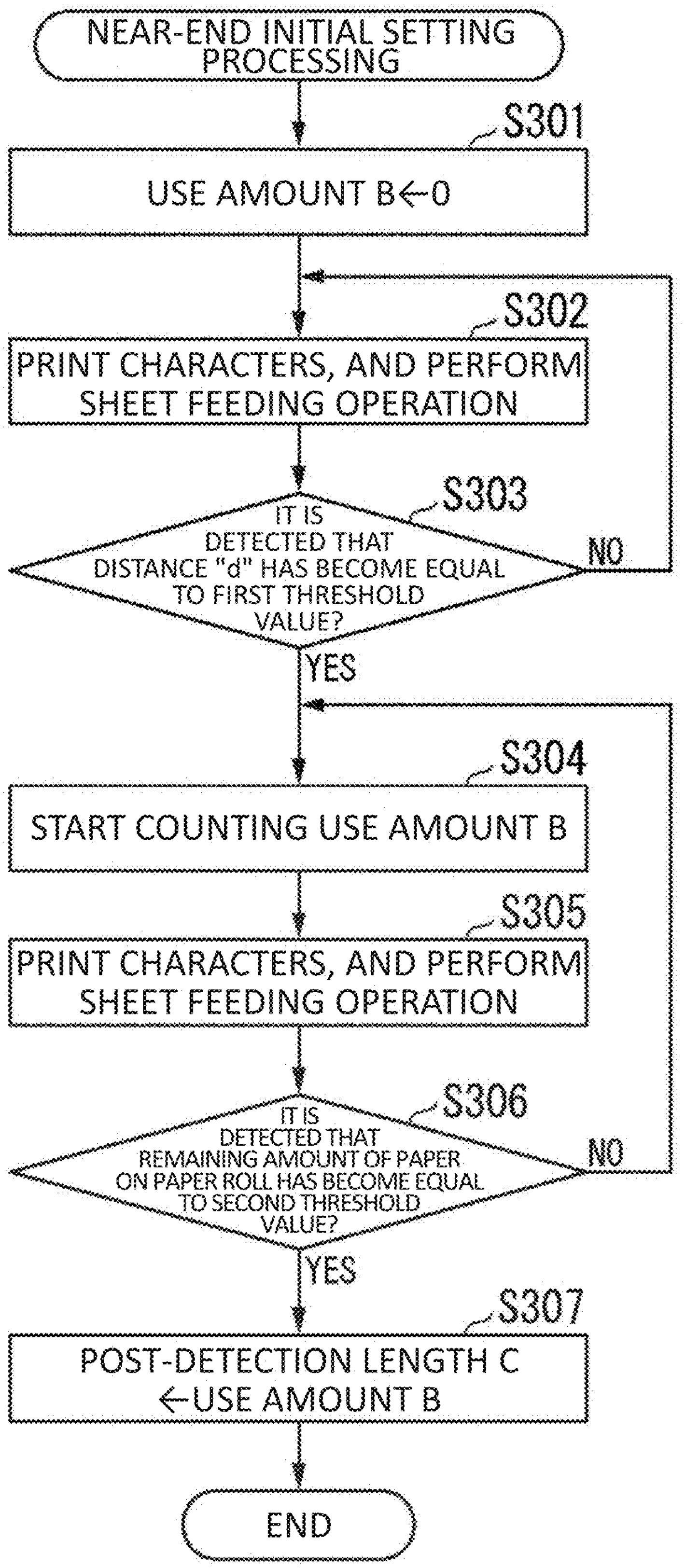
FIG. 7 is a flowchart for illustrating a flow of near-end initial setting processing.

FIG. 7 is a flowchart for illustrating a flow of the near-end initial setting processing (Step S102). The printing apparatus 100 initializes a use amount B to zero (Step S301). In this step, the use amount corresponds to a use amount of paper from the paper roll. The use amount is obtained by calculating a length of paper from the paper roll based on the number of revolutions of the stepping motor of the sheet feeding unit 132. For example, when a length of paper from the paper roll which is used per revolution is represented by L, the use amount is calculated by the expression: (use amount B)=L×(number of revolutions). The printing apparatus 100 prints characters in accordance with, for example, a request from the information processing apparatus 200, and performs a sheet feeding operation (Step S302).

The printing apparatus 100 determines whether or not the above-mentioned distance "d" has become equal to the first threshold value as a result of the use of paper from the paper roll (Step S303). When the distance "d" has not become equal to the first threshold value (Step S303: NO), the process of the printing apparatus 100 returns to Step S302. When the distance "d" has become equal to the first threshold value (Step S303: YES), the printing apparatus 100 starts counting the use amount B (Step S304). After that, the printing apparatus 100 prints characters in accordance with, for example, a request from the information processing apparatus 200 and performs a sheet feeding operation (Step S305).

The printing apparatus 100 determines whether or not the remaining amount of paper on the paper roll has become equal to the second threshold value as a result of use of paper from the paper roll (Step S306). When the remaining amount of paper on the paper roll has not become equal to the second threshold value (Step S306: NO), the process of the printing apparatus 100 returns to Step S304. When the remaining amount of paper on the paper roll has become equal to the second threshold value (Step S306: YES), the printing apparatus 100 substitutes the use amount B for a post-detection length C (Step S307), and then ends the processing. As described above, the post-detection length corresponds to a length of paper used from the paper roll from the time when it is detected that the physical quantity has become equal to the first threshold value until the remaining amount of paper on the paper roll becomes equal to the second threshold value.

Figure 8:
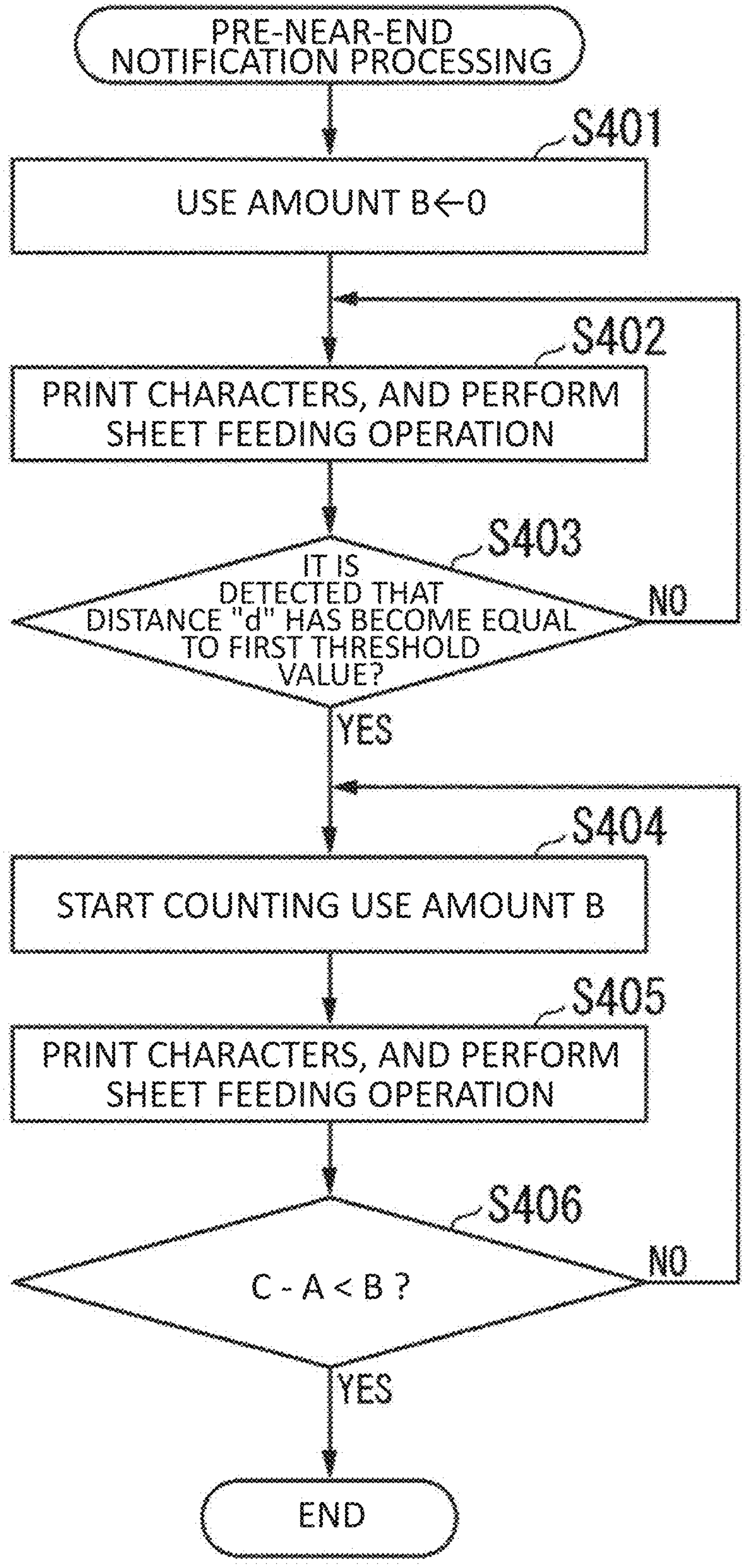
FIG. 8 is a flowchart for illustrating a flow of pre-near-end notification processing.

FIG. 8 is a flowchart for illustrating a flow of the pre-near-end notification processing (Step S201). The pre-near-end notification processing is performed under a state in which a new unused paper roll is placed as described above.

The printing apparatus 100 initializes the use amount B to zero (Step S401). The printing apparatus 100 prints characters in accordance with, for example, a request from the information processing apparatus 200 and performs a sheet feeding operation (Step S402). The printing apparatus 100 determines whether or not the above-mentioned distance "d" has become equal to the first threshold value as a result of the use of the paper roll (Step S403). When the distance "d" has not become equal to the first threshold value (Step S403: NO), the process of the printing apparatus 100 returns to Step S402. When the distance "d" has become equal to the first threshold value (Step S403: YES), the printing apparatus 100 starts counting the use amount B (Step S404). After that, the printing apparatus 100 prints characters in accordance with, for example, a request from the information processing apparatus 200 and performs a sheet feeding operation (Step S405).

The printing apparatus 100 determines whether or not the use amount B has exceeded a reference value (C-A) obtained by subtracting the user setting value A from the post-detection length C (Step S406). When the use amount B has not exceeded the reference value (C-A) (Step S406: NO), the process of the printing apparatus 100 returns to Step S404. When the use amount B has exceeded the reference value (C-A) (Step S406: YES), the printing apparatus 100 ends the processing.

Now, the reason why the reference value (C-A) is used is described. The post-detection length C is a remaining amount of paper on the paper roll after the detection performed by the near-end sensor unit 131. The user setting value A indicates a remaining amount of paper on the paper roll, which is set by the user. Thus, the reference value (C-A) indicates a length of paper used from the paper roll from the time when the detection is performed by the near-end sensor unit 131 until the remaining amount becomes equal to the user setting value A. Thus, when the use amount B is equal to the reference value (C-A), the remaining amount of paper on the paper roll is equal to the user setting value. Thus, in Step S202, which is carried out subsequent to the pre-near-end notification processing (Step S201), a near-end notification is issued.

Figure 9:
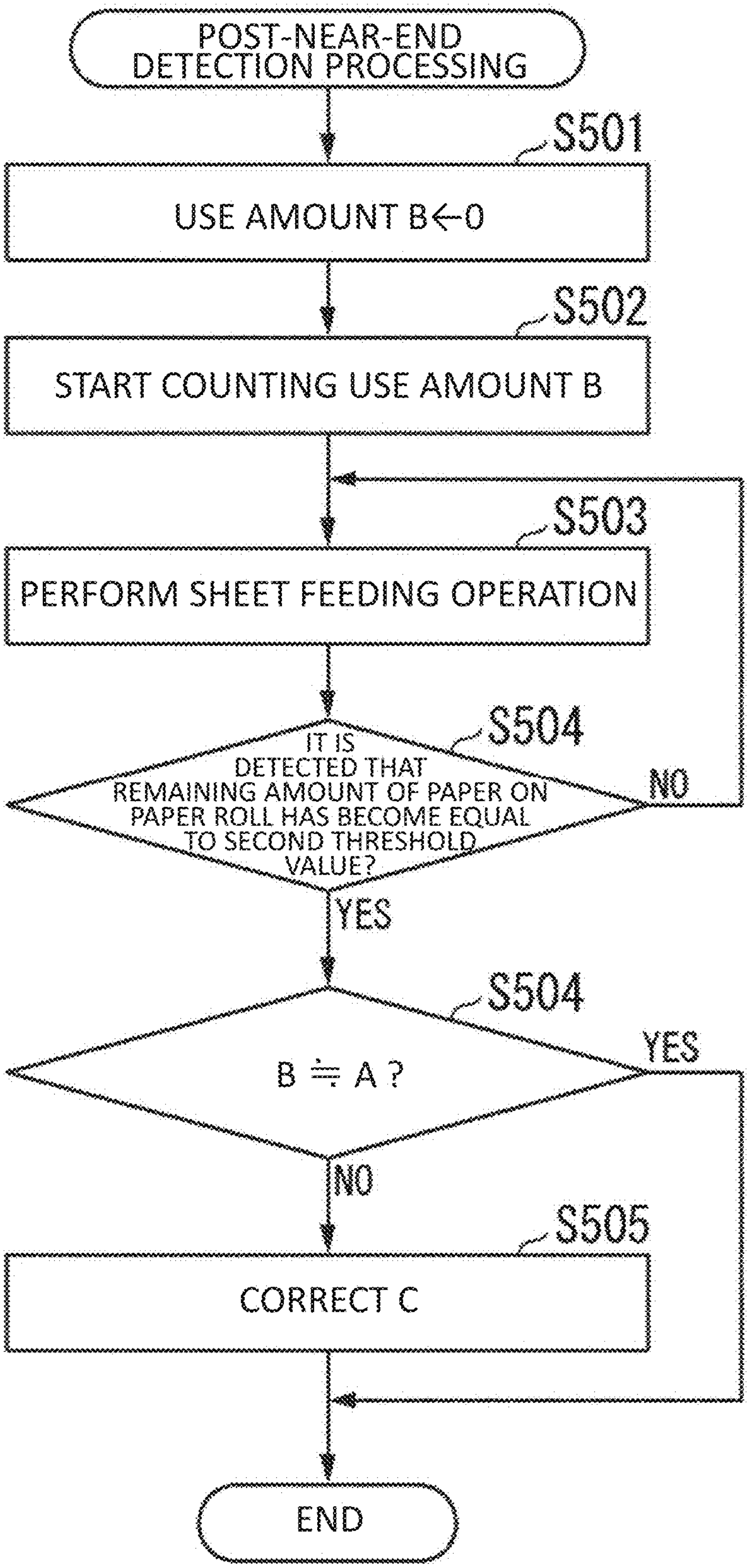
FIG. 9 is a flowchart for illustrating a flow of post-near-end notification processing.

FIG. 9 is a flowchart for illustrating a flow of the post-near-end notification processing (Step S203). The printing apparatus 100 initializes the use amount B to zero (Step S501). The printing apparatus 100 starts counting the use amount B (Step S502). The printing apparatus 100 performs a sheet feeding operation (Step S503).

The printing apparatus 100 determines whether or not the remaining amount of paper on the paper roll has become equal to the second threshold value as a result of the sheet feeding operation (Step S504). When the remaining amount of paper roll has not become equal to the second threshold value (Step S504: NO), the process of the printing apparatus 100 returns to Step S503. Specifically, the sheet feeding operation is continued. When the remaining amount of paper roll has become equal to the second threshold value (Step S504: YES), the printing apparatus 100 determines whether or not the use amount B is substantially equal to the user setting value A (Step S505). The reason why it is determined whether or not the use amount B is substantially equal to the user setting value A in Step S505 is because the use amount B varies depending on an environment such as a temperature and a humidity. Thus, values a and p for permitting a change in the use amount B are determined in advance. When the user setting value A falls within a range (from $B-\alpha$ to $B+\beta$), it is determined that the use amount B is substantially equal to the user setting value A. When the use amount B is substantially equal to the user setting value A (Step S504: YES), the printing apparatus 100 ends the processing.

Meanwhile, when the use amount B is not substantially equal to the user setting value A (Step S504: NO), the printing apparatus 100 corrects the post-detection length C (Step S505), and then ends the processing. As a correction method, (A−B) is subtracted from the post-detection length C, which is not corrected yet, to obtain a new post-detection length C ($C \leftarrow C-(A-B)$). When (A−B) is larger than zero, the post-detection length C is larger than an actual value of the post-detection length C by (A−B). Thus, the post-detection length C can be corrected to the actual value of the post-detection length C by subtracting (A−B). Meanwhile, when (A−B) is smaller than zero, the post-detection length C is smaller than the actual value of the post-detection length C by (B−A). Thus, the post-detection length C can be corrected to the actual value of the post-detection length C by adding (B−A). As described above, the remaining amount of paper on the paper roll, which is set by the user, can be accurately detected by performing the correction.

In the at least one embodiment described above, the use amount B may be corrected because a component associated with sheet feeding, such as a gear, may expand or shrink depending on a temperature and a humidity. For example, the use amount B is corrected by an expression using a correction coefficient "k": (use amount B)=k×L×(number of revolutions). For example, a standard temperature criterion is set in advance. When a temperature is higher than the criterion, a sheet feeding amount increases and thus "k" is set to a value smaller than 1. When a temperature is lower than the criterion, a sheet feeding amount decreases and thus "k" is set to a value larger than 1. The remaining amount of paper on the paper roll, which is set by the user, can be more accurately detected by adjusting the use amount in accordance with the environment as described above.

Modification Example

Figure 10:
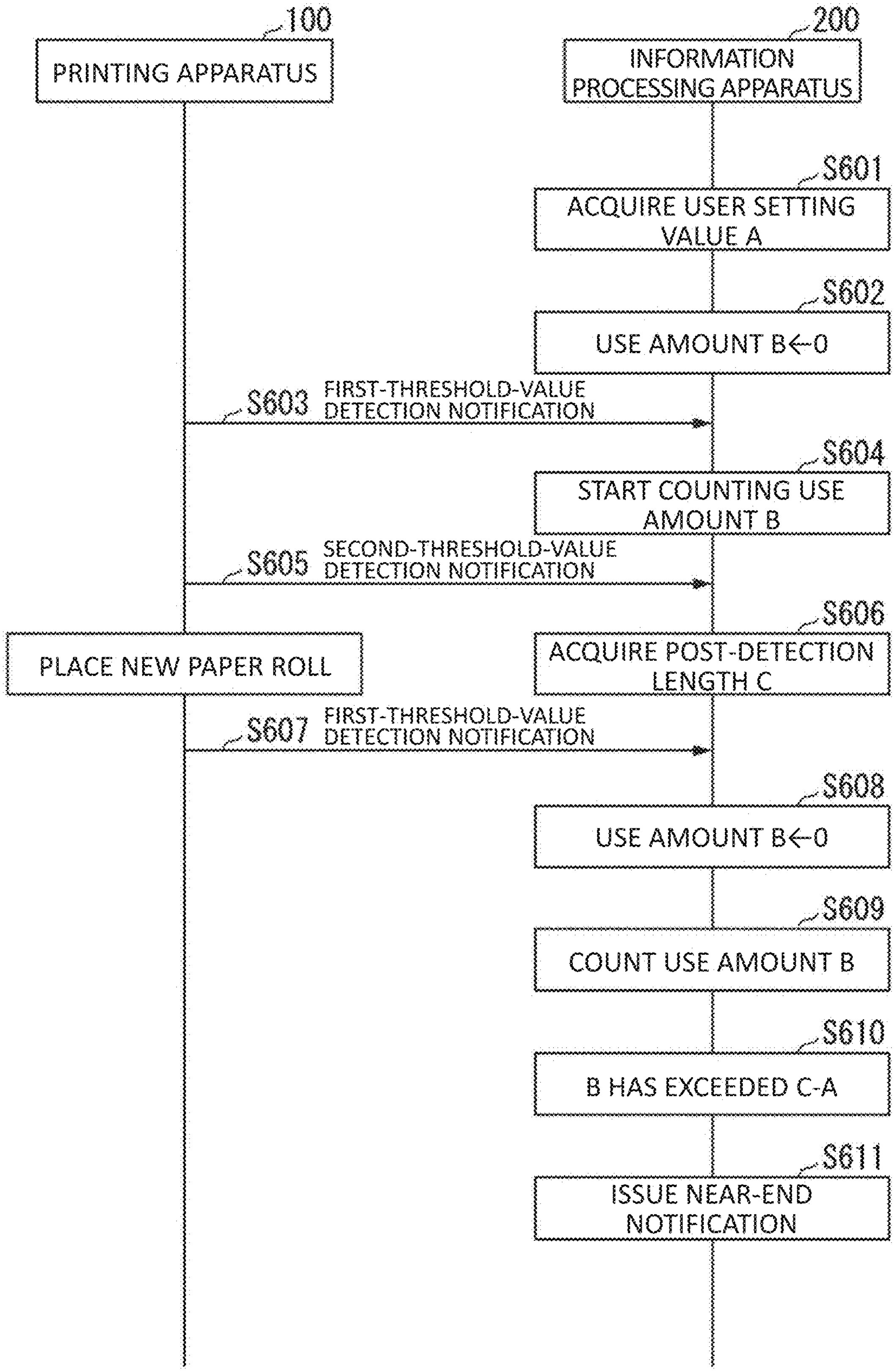
FIG. 10 is a sequence diagram for illustrating an example of processing performed by the printing system.

The above-mentioned processing in the at least one embodiment may be performed by the information processing apparatus 200. FIG. 10 is a sequence diagram for illustrating an example of processing performed by the printing system 10 when the above-mentioned processing in the at least one embodiment is performed by the information processing apparatus 200. In this modification example, the printing apparatus 100 notifies the information processing apparatus 200 of the use amount of paper from the paper roll each time the use amount changes. In FIG. 10, the illustration of the notification of the use amount is omitted so as to avoid complication.

The information processing apparatus 200 acquires the user setting value A that is set by the user (Step S601). The information processing apparatus 200 initializes the use amount B (Step S602). The printing apparatus 100 transmits a first-threshold-value detection notification indicating that the distance "d" has become equal to the first threshold value to the information processing apparatus 200 (Step S603). When the information processing apparatus 200 receives the first-threshold-value detection notification, the information processing apparatus 200 starts counting the use amount B (Step S604). After that, the information processing apparatus 200 updates the use amount B each time the use amount is notified from the printing apparatus 100 until the information processing apparatus 200 receives a second-threshold-value detection notification described later.

The printing apparatus 100 transmits the second-threshold-value detection notification indicating that the remaining amount of paper on the paper roll has become equal to the second threshold value to the information processing apparatus 200 (Step S605). When the information processing apparatus 200 receives the second-threshold-value detection notification, the information processing apparatus 200 acquires the post-detection length C (Step S606). After a new paper roll is placed, the printing apparatus 100 transmits a paper-roll replacement notification indicating that a new paper roll has been placed to the information processing apparatus 200 (Step S607). When the information processing apparatus 200 receives the paper-roll replacement notification, the information processing apparatus 200 initializes the use amount B (Step S608). After that, the information processing apparatus 200 updates the use amount B each time the use amount is notified from the printing apparatus 100 until the use amount B exceeds the reference value (C-A) obtained by subtracting the user setting value A from the post-detection length C (Step S609).

When the use amount B exceeds the reference value (C-A) obtained by subtracting the user setting value A from the post-detection length C (Step S610), the information processing apparatus 200 issues a near-end notification (Step S611). As described above, also when the information processing apparatus 200 that is communicable to/from the printing apparatus 100 performs the processing, the near-end notification can be issued.

In addition to the use amount B, a parameter for counting the use amount may be set in the information processing apparatus 200. A use amount E for one paper roll is acquired in advance based on the parameter. Each time the use amount is notified from the printing apparatus 100, the use amount is subtracted from the use amount E. In this manner, the remaining amount of paper on the paper roll can be obtained. When the remaining amount is displayed on the information processing apparatus 200, the user can determine whether or not printing is possible.

According to the at least one embodiment described above, the user setting value based on which the near-end notification is issued can be set by the user. Further, the use amount can be counted with high accuracy. Thus, even when the user sets the user setting value to a relatively small value, the near-end notification can be issued with high accuracy. Further, the amount of paper used from the paper roll after the detection performed by the near-end sensor unit 131, is used. Thus, the near-end notification can be issued with high accuracy without being affected by the diameter or the thickness of the paper core of the paper roll. Further, the user is not required to check a remaining length after the detection of the near end, which has been required in the related art. Thus, the near-end notification can be issued with high accuracy without bothering the user.

A program for causing the printing apparatus 100 and the information processing apparatus 200 to execute the above-mentioned processing may be recorded on a computer-readable recording medium. The computer-readable recording medium includes, for example, a portable medium such as a flexible disk, a magneto-optical disk, a ROM, and a CD-ROM and a storage device such as a hard disk drive and a solid state drive (SSD), which are built in a computer system. An image processing program may be transmitted via a telecommunication line.

The functions of the printing apparatus 100 and the information processing apparatus 200 according to the above-mentioned at least one embodiment may be implemented by a computer. In that case, the functions may be implemented by recording a program for implementing the functions in the computer-readable recording medium and causing a computer system to read and execute the program stored in this recording medium. The "computer system" as used herein includes an OS and hardware such as peripheral devices. Further, the "computer-readable recording medium" refers to a portable medium such as a flexible disk, a magneto-optical disk, a ROM, and a CD-ROM or a storage device such as a hard disk drive built in the computer system. Further, the "computer-readable recording medium" may include an entity for dynamically holding a program for a short period of time such as a communication wire through which the program is transmitted via a network such as the Internet or a communication line such as a phone line, and also include an entity for holding a program for a certain period of time such as a volatile memory inside the computer system serving as a server or a client in that case. Further, the program may implement a part of the above-mentioned functions, or may implement the above-mentioned functions in combination with programs already recorded in the computer system.

Certain embodiments of the present invention have been described. However, those embodiments are presented as examples and are not intended to limit the scope of the invention. Those embodiments may be implemented in other various modes, and various kinds of omissions, replacements, and modifications can be made without departing from the gist of the invention. Those embodiments and variations thereof are included in the scopes of the invention described in the appended claims and their equivalents in the same way as those are included in the scope and gist of the invention.

What is claimed is:

1. A printing apparatus, comprising:

a user-setting-value acquiring unit configured to acquire a user setting value indicating a remaining amount of paper on a paper roll, the user setting value being set by a user;

a first detection unit configured to detect that a physical quantity correlated with a remaining amount of paper on the paper roll has become equal to a first threshold value;

a second detection unit configured to detect that the remaining amount of paper on the paper roll has become equal to a second threshold value;

a post-detection length acquiring unit configured to acquire a post-detection length being a length of paper used from the paper roll from a time when it is detected that the physical quantity has become equal to the first threshold value until the remaining amount of paper on the paper roll becomes equal to the second threshold value; and a notification unit configured to notify that, when a new paper roll is used and a length of paper used from the new paper roll from a time when it is detected that the physical quantity has become equal to the first threshold value exceeds a reference value obtained by subtracting the user setting value from the post-detection length, a remaining amount of paper on the new paper roll has become equal to the user setting value.

2. The printing apparatus according to claim 1, further comprising a correction unit configured to correct the post-detection length in accordance with a length of paper used from the new paper roll from a time when the length of paper used from the new paper roll after it is detected that the physical quantity has become equal to the first threshold value exceeds the reference value obtained by subtracting the user setting value from the post-detection length until the physical quantity becomes equal to the second threshold value.

3. A control method for a printing apparatus, comprising:

a user-setting-value acquiring step of acquiring a user setting value indicating a remaining amount of paper on a paper roll, the user setting value being set by a user;

a first detection step of detecting that a physical quantity correlated with a remaining amount of paper on the paper roll has become equal to a first threshold value;

a second detection step of detecting that the remaining amount of paper on the paper roll has become equal to a second threshold value;

a post-detection length acquiring step of acquiring a post-detection length being a length of paper used from the paper roll from a time when it is detected that the physical quantity has become equal to the first threshold value until the remaining amount of paper on the paper roll becomes equal to the second threshold value; and a notification step of notifying that, when a new paper roll is used and a length of paper used from the new paper roll from a time when it is detected that the physical quantity has become equal to the first threshold value exceeds a reference value obtained by subtracting the user setting value from the post-detection length, a remaining amount of paper on the new paper roll has become equal to the user setting value.

4. A non-transitory computer readable storage medium comprising instructions executed by a computer to implement:

a user-setting-value acquiring unit configured to acquire a user setting value indicating a remaining amount of paper on a paper roll, the user setting value being set by a user;

a first detection unit configured to detect that a physical quantity correlated with a remaining amount of paper on the paper roll has become equal to a first threshold value;

a second detection unit configured to detect that the remaining amount of paper on the paper roll has become equal to a second threshold value;

a post-detection length acquiring unit configured to acquire a post-detection length being a length of paper used from the paper roll from a time when it is detected that the physical quantity has become equal to the first threshold value until the remaining amount of paper on the paper roll becomes equal to the second threshold value; and a notification unit configured to notify that, when a new paper roll is used and a length of paper used from the new paper roll from a time when it is detected that the physical quantity has become equal to the first threshold value exceeds a reference value obtained by subtracting the user setting value from the post-detection length, a remaining amount of paper on the new paper roll has become equal to the user setting value.

5. An information processing apparatus being communicable to/from a printing apparatus, the information processing apparatus comprising:

a user-setting-value acquiring unit configured to acquire a user setting value indicating a remaining amount of paper on a paper roll, the user setting value being set by a user;

a use-amount acquiring unit configured to acquire a length of paper used from the paper roll in the printing apparatus;

a post-detection length acquiring unit configured to acquire a post-detection length being a length of paper used from the paper roll in the printing apparatus from a time when it is notified that a physical quantity correlated with a remaining amount of paper on the paper roll has become equal to a first threshold value until it is notified that the remaining amount of paper on the paper roll has become equal to a second threshold value; and a notification unit configured to notify that, when a new paper roll is used and a length of paper used from the new paper roll after it is notified that the physical quantity has become equal to the first threshold value exceeds a reference value obtained by subtracting the user setting value from the post-detection length, a remaining amount of paper on the new paper roll has become equal to the user setting value.

6. A printing system, comprising a printing apparatus and an information processing apparatus being communicable to/from the printing apparatus, the printing apparatus including:

a first detection unit configured to detect that a physical quantity correlated with a remaining amount of paper on a paper roll has become equal to a first threshold value;

a second detection unit configured to detect that the remaining amount of paper on the paper roll has become equal to a second threshold value;

a first notification unit configured to notify the information processing apparatus that, when it is detected that the physical quantity has become equal to the first threshold value, the physical quantity has become equal to the first threshold value;

a second notification unit configured to notify the information processing apparatus that, when it is detected that the remaining amount of paper on the paper roll has become equal to the second threshold value, the physical quantity has become equal to the second threshold value; and a use-amount notifying unit configured to notify the information processing apparatus of a length of paper used from the paper roll, the information processing apparatus including:

a user-setting-value acquiring unit configured to acquire a user setting value indicating a remaining amount of paper on the paper roll, the user setting value being set by a user;

a use-amount acquiring unit configured to acquire the length of paper used from the paper roll, which is notified by the use-amount notifying unit;

a post-detection length acquiring unit configured to acquire a post-detection length being a length of paper used from the paper roll from a time when the first notification unit notifies that the physical quantity has become equal to the first threshold value until the second notification unit notifies that the remaining amount of paper on the paper roll has become equal to the second threshold value; and a notification unit configured to notify that, when a new paper roll is used and a length of paper used from the new paper roll after the first notification unit notifies that the physical quantity has become equal to the first threshold value exceeds a reference value obtained by subtracting the user setting value from the post-detection length, the remaining amount of paper on the new paper roll has become equal to the user setting value.

* * * * *